(12) United States Patent
Jevans et al.

(10) Patent No.: US 8,356,105 B2
(45) Date of Patent: Jan. 15, 2013

(54) ENTERPRISE DEVICE POLICY MANAGEMENT

(75) Inventors: David Jevans, Menlo Park, CA (US); Gil Spencer, Los Gatos, CA (US)

(73) Assignee: MarbleCloud, Inc., Sunnyvale, CA (US)

( * ) Notice: Subject to any disclaimer, the term of this patent is extended or adjusted under 35 U.S.C. 154(b) by 0 days.

(21) Appl. No.: 12/434,630

(22) Filed: May 2, 2009

(65) Prior Publication Data

US 2009/0276534 A1 Nov. 5, 2009

Related U.S. Application Data

(60) Provisional application No. 61/126,473, filed on May 2, 2008.

(51) Int. Cl.
*G06F 15/16* (2006.01)
*G11C 7/00* (2006.01)

(52) U.S. Cl. .................................. 709/229; 726/20

(58) Field of Classification Search .......... 709/225–226, 709/200, 229; 380/259–260, 277–286; 726/1–6, 726/26–29, 16–20; 713/182, 189–194; 711/115
See application file for complete search history.

(56) References Cited

U.S. PATENT DOCUMENTS

| | | | | |
|---|---|---|---|---|
| 5,457,746 A * | 10/1995 | Dolphin | ................... | 705/51 |
| 6,094,721 A | 7/2000 | Eldridge et al. | | |
| 6,539,480 B1 * | 3/2003 | Drews | ................... | 713/191 |
| 7,831,045 B2 * | 11/2010 | Junod | ................... | 380/228 |
| 2002/0044663 A1 * | 4/2002 | King et al. | ................... | 380/284 |
| 2003/0159053 A1 * | 8/2003 | Fauble et al. | ................... | 713/189 |
| 2004/0148333 A1 | 7/2004 | Manion et al. | | |
| 2006/0041932 A1 | 2/2006 | Cromer et al. | | |
| 2006/0184806 A1 * | 8/2006 | Luttmann et al. | ................... | 713/193 |
| 2006/0224742 A1 | 10/2006 | Shahbazi | | |
| 2006/0236363 A1 | 10/2006 | Heard et al. | | |
| 2007/0083939 A1 * | 4/2007 | Fruhauf et al. | ................... | 726/34 |
| 2007/0160198 A1 | 7/2007 | Orsini et al. | | |
| 2007/0181698 A1 * | 8/2007 | Wilson | ................... | 235/492 |
| 2007/0266421 A1 | 11/2007 | Vaidya et al. | | |
| 2007/0300052 A1 | 12/2007 | Jevans | | |
| 2008/0040613 A1 | 2/2008 | Challener | | |
| 2009/0300710 A1 * | 12/2009 | Chai et al. | ................... | 726/1 |
| 2009/0307451 A1 * | 12/2009 | Abzarian et al. | ................... | 711/163 |

OTHER PUBLICATIONS

PCT International Search Report, PCT Application No. PCT/US09/42637, Jun. 19, 2009, 8 pages.
PCT International Search Report, PCT Application No. PCT/US09/42638, Nov. 30, 2009, 8 pages.

* cited by examiner

*Primary Examiner* — Brendan Higa
(74) *Attorney, Agent, or Firm* — Fenwick & West LLP

(57) ABSTRACT

Methods and systems for managing policies of portable data storage devices in conjunction with a third-party service are disclosed. One or more candidates of a plurality of members in an enterprise may be identifying via the third-party service. Each of the plurality of members may be associated with a respective portable data storage device. An indication provided by the third-party service of one or more candidate devices may be obtained. The one or more candidate devices may each be a portable data storage device associated with a respective candidate. Policies of the one or more candidate devices may be modified.

20 Claims, 4 Drawing Sheets

ENTERPRISE DEVICE POLICY MANAGEMENT

CROSS-REFERENCE TO RELATED APPLICATION

The present application claims the benefit and priority of U.S. Provisional Patent Application No. 61/126,473 filed May 2, 2008 and entitled "Enterprise Device Recovery," and is related to U.S. patent application Ser. No. 12/434,628, filed May 2, 2009 and entitled "Enterprise Device Recovery," the disclosures of which are both incorporated herein by reference.

BACKGROUND OF THE INVENTION

1. Field of the Invention

The present invention relates generally to storage devices. More specifically, the present invention relates to enterprise device policy management.

2. Related Art

Concerns about the security of portable data storage devices such as USB flash drives continue to grow, especially for enterprise security managers. Hundreds of millions of USB flash drives are sold each year. With an average storage capacity exceeding one gigabyte, these USB flash drives represent one of the most difficult to control and potentially costly security risks facing enterprises and other organizations. Uncontrolled usage of portable data storage devices results in real-world repercussions. For example, approximately 75 percent of Fortune 1000 companies fell victim to data leakage in 2006, with an average cost of recovery that exceeded $5,000,000.

Secure USB flash drives represent one secure and easy-to-use solution to the problem of physical device security. However, physical security of USB flash drives is only one issue faced by enterprise security managers. With thousands of USB flash drives being used in a given organization, managing the usage and policies of those devices presents an equally significant challenge. As such, there is a need to ensure that a minimum set of security standards can be established and automatically enforced across an entire group of portable data storage devices. Furthermore, there is a need to allow flexible implementation to conform to policies of a specific user group.

SUMMARY OF THE INVENTION

Embodiments of the present technology provide for policy management of devices issued to members of an enterprise or other organization.

In a first claimed embodiment, a method for managing policies of portable data storage devices in conjunction with a third-party service is disclosed. The method includes identifying one or more candidates of a plurality of members in an enterprise via the third-party service. Each of the plurality of members are associated with a respective portable data storage device. The method further includes obtaining an indication provided by the third-party service of one or more candidate devices. The one or more candidate devices are each a portable data storage device associated with a respective candidate. Additionally, the method includes modifying policies of the one or more candidate devices.

The policies of any given candidate device can vary depending on the needs of a specific enterprise. For example, according to some embodiments, the policies determine whether the one or more candidate devices can be accessed. The policies determine operability of software applications associated with the one or more candidate devices, in various embodiments. The policies may determine whether the one or more candidate devices must communicate with the third-party service prior to being accessed. Additionally, the policies may be related to one or more passwords associated with the one or more candidate devices. In accordance with some embodiments, the policies determine an administrative level attributed to the one or more candidate devices. Furthermore, the policies may determine whether a candidate can control one or more features of a candidate device associated therewith. It is also noteworthy that the policies may be different for two or more candidate devices.

Certain authentication actions may be performed with respect to the candidate devices in conjunction with the third-party service. For example, the indication provided by the third-party service of the one or more candidate devices may include a different administrator-device public key associated with each of the one or more candidate devices and a shared administrator keypair. The method may further include importing each administrator-device public key into the one or more candidate devices associated therewith, and importing the shared administrator keypair into each of the one or more candidate devices. Additionally, the method may include encrypting the imported shared administrator keypair in each candidate device with the imported administrator-device public key associated with that candidate device. In some embodiments, the method includes sending each encrypted shared administrator keypair to the third-party service. An administrator-device public key is encrypted and signed by a third-party service public key in the method, in accordance with some embodiments. Additionally, the indication provided by the third-party service may further include a shared administrator public key. Furthermore, the shared administrator keypair may be encrypted and signed by a third-party service public key. According to various embodiments, the method includes zeroizing one or more of the shared administrator keypair associated with each candidate device or the administrator-device public key.

In a second claimed embodiment, a system for managing policies of portable data storage devices in conjunction with a third-party service is set forth. The system includes an enterprise member module, an enterprise device module, and an interface module, all of which may be stored in memory and executed by a processor to effectuate the functionality attributed thereto. The enterprise member module is executable to identify one or more candidates of a plurality of members in an enterprise via the third-party service. Each of the plurality of members are associated with a respective portable data storage device. The enterprise device module stored is executable to obtain an indication provided by the third party of one or more candidate devices. The one or more candidate devices are each a portable data storage device associated with a respective candidate. The interface module is executable to modify policies of the one or more candidate devices.

In the system, the indication may include a different administrator-device public key associated with each of the one or more candidate devices and a shared administrator keypair, according to some embodiments. Furthermore, the system may further include an authentication module stored in memory and executable by a processor to import each administrator-device public key into the one or more candidate devices associated therewith, and to import the shared administrator keypair into each of the one or more candidate devices.

A third claimed embodiment discloses a computer readable storage medium having a program embodied thereon. The program is executable by a processor to perform method for extending the service life of a data storage device. The method includes identifying one or more candidates of a plurality of members in an enterprise via the third-party service, each of the plurality of members being associated with a respective portable data storage device; obtaining an indication provided by the third party of one or more candidate devices, the one or more candidate devices each being a portable data storage device associated with a respective candidate; and modifying policies of the one or more candidate devices.

DETAILED DESCRIPTION OF EXEMPLARY EMBODIMENTS

The present technology provides methods and systems for conveniently and effectively managing policies of devices issued to members of an enterprise or other organization. This policy management can alleviate critical concerns related to consistency of device policies in an enterprise with one or many groups (e.g., divisions, departments, teams, etc.) using portable data storage devices. For example, if a company has a seven character minimum for password length, then an enterprise administrator can be capable of enforcing that policy across all departments within their span of control. Additionally, the present technology can address the cost involved with consistent management. Consistent management may be ineffective if the cost of administration is too high to make it practical. With hundreds or thousands of devices in a given user group, device management at a centralized control console may be desirable.

The present technology provides a straightforward and cost-effective interface for managing tens, hundreds or thousands of devices through a centralized management console. Such a console may be delivered as an on-line service, reducing overall deployment times and maintenance requirements of the devices. The service may be provided by a third party and may also scale easily as more portable data storage devices are deployed in an enterprise. Policies of devices can be configured or modified via the centralized management console.

Adding and managing enterprise administrators can also be easily achieved with the present technology. For example, the present technology provides for centrally granting and revoking the ability for administrators to establish device policies and the ability to recover the end user passwords. Additionally, the centralized management console can allow applications stored on, and launched from, the devices to be configured. For example, an enterprise administrator can allow or prohibit the use of applications on-board the devices such as Mozilla Firefox web browser, a password manager, secure web surfing services, and encrypted online password backup services.

Figure 1:
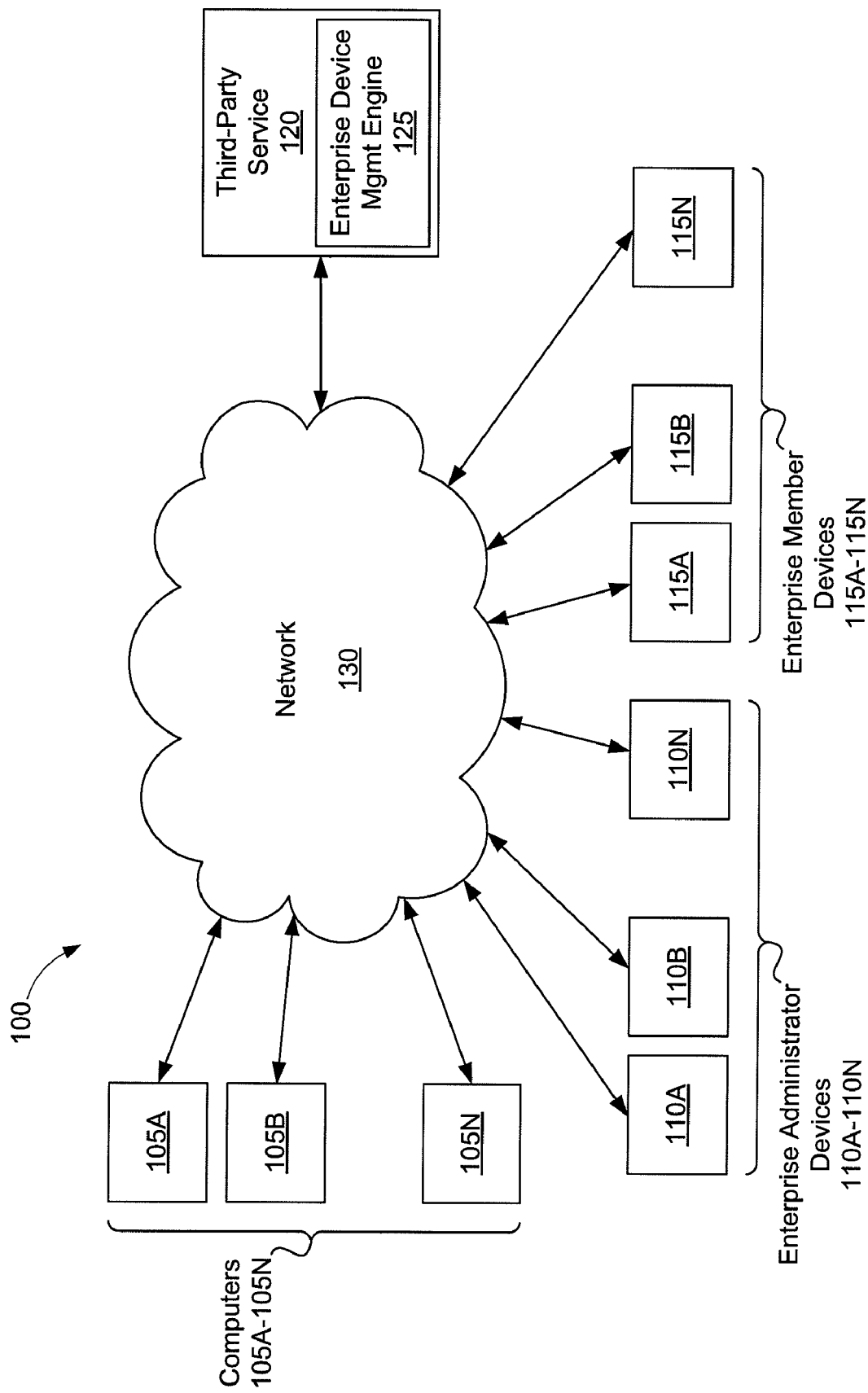
FIG. 1 is a block diagram of an exemplary environment for practicing embodiments of the present technology.

Referring now to FIG. 1, a block diagram of an exemplary environment 100 for practicing embodiments of the present technology is shown. As depicted, the environment 100 includes a plurality of computers 105A-105N, a plurality of enterprise administrator devices 110A-110N, a plurality of enterprise member devices 115A-115N, a third-party service 120 comprising an enterprise device management engine 125, and a network 130. It is noteworthy that the environment 100 may comprise any number of the computers 105A-105N, the enterprise administrator devices 110A-110N, and the enterprise member devices 115A-115N. In one example, the environment 100 includes hundreds of the enterprise administrator devices 110A-110N and thousands of the enterprise member devices 115A-115N.

Each of the computers 105A-105N can comprise any computing device communicatively coupled with the network 130. The communicative coupling may be wired or wireless. The computers 105A-105N may be, for example, personal computers or workstations accessible to administrators or members of an enterprise. Additionally, the computers 105A-105N can be located within facilities of an enterprise or elsewhere. Administrators of an enterprise include persons that are associated with the enterprise and have some level of authority in setting and/or enforcing policies of the enterprise. Conversely, members of an enterprise include persons that are associated with the enterprise, but do not have authority in setting and/or enforcing policies of the enterprise. An individual enterprise administrator or member can use any of the computers 105A-105N to access the third-party service 120 via the network 130.

The enterprise administrator devices 110A-110N and the enterprise member devices 115A-115N are portable data storage devices. Each enterprise administrator is associated with one of the enterprise administrator devices 110A-110N, while each enterprise member is associated with one of the enterprise member devices 115A-115N. The enterprise administrator devices 110A-110N have different policies associated therewith relative to the enterprise member devices 115A-115N. What distinguishes the administrator devices 110A-110N from the enterprise member devices 115A-115N includes the respective policies attributed thereto. Different policies associated with both the enterprise administrator devices 110A-110N and the enterprise member devices 115A-115N are discussed further herein.

A portable data storage device may be any device used to store digital information. Examples of portable data storage devices include USB flash drives, external hard drives, and other peripheral storage devices. For illustrative purposes, portable data storage devices are described herein in the context of USB flash drives. Portable data storage devices are discussed in further detail in connection with FIG. 2.

According to exemplary embodiments, a portable data storage device can be coupled or decoupled by a user (e.g., an enterprise administrator or an enterprise member) with a host device (not depicted). Such a host device may facilitate communicative coupling between a portable data storage device and the network 130. Host devices include any digital device that can interface with a portable data storage device and the network 130. Examples of a host device include a personal computer, a personal digital assistant (PDA), a Smartphone, and other various devices. A host device may include one or more communications interfaces to facilitate communicative coupling with a portable data storage device. One or more communications interfaces may also facilitate communicative coupling to the network 130. Additionally, a host device includes a processor, memory such as RAM, and storage such as ROM. Those skilled in the art will be familiar with the components and functionality of digital devices such as a host device.

In exemplary embodiments, the third-party service 120 is a service provided by a third party that allows one or more administrators of an enterprise to conveniently and effectively manage policies of the enterprise administrator devices 110A-110N and the enterprise member devices 115A-115N. A third party may operate one or more servers that provide the third-party service 120. As mentioned, the third-party service 120 can be accessed via the network 130. As depicted in FIG. 1, the third-party service includes the enterprise device management engine 125, which is described further in connection with FIG. 3. It is noteworthy that, in alternate embodiments, the functions attributed to the third-party service 120 may be performed by an entity within a given enterprise.

The network 130 may be a wide-area network and include a private network (e.g., a leased line network) or a public network (e.g., the Internet). In some embodiments, the network 130 may be a local area network and cover a relatively small geographic range. Local area networks include wired networks (e.g., Ethernet) or wireless networks (e.g., Wi-Fi). The network 130 includes hardware and/or software elements that enable the exchange of information (e.g., voice and data) between constituent elements of the environment 100.

Figure 2:
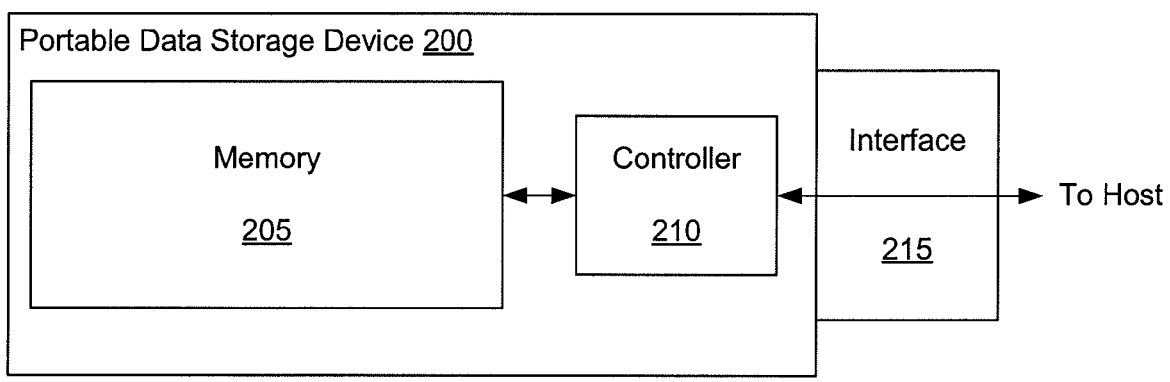
FIG. 2 is a block diagram of an exemplary portable data storage device.

FIG. 2 is a block diagram of an exemplary portable data storage device 200. As mentioned, the enterprise administrator devices 110A-110N and the enterprise member devices 115A-115N are all portable data storage devices such as the portable data storage device 200. The portable data storage device 200 depicted in FIG. 2 includes a memory 205, a controller 210, and an interface 215.

The memory 205 includes a computer-readable storage medium having a plurality of physical blocks to which data can be written to. While common forms of computer-readable storage media include, for example, a floppy disk, a flexible disk, a hard disk, magnetic tape, any other magnetic medium, a CD-ROM disk, digital video disk (DVD), and any other optical medium, the memory 205 is described in the context of non-volatile memory that can be electrically erased and rewritten. Examples of such non-volatile memory include flash memory such as NAND flash and NOR flash. Flash memory may include single level cells, multi level cells, or a combination thereof. Additionally, the memory 205 may include more than one chip, in accordance with some embodiments, wherein each chip comprises a different portion of the physical blocks. Furthermore, the memory 205 may comprise other memory technologies as they become available.

The controller 210 may be a processor or microcontroller with an amount of on-chip ROM and/or RAM. The controller 210 is communicatively coupled with the memory 205 and the interface 215. Additionally, the controller 210 includes software and/or firmware that may execute various modules described herein. As such, the controller 210 functions as an intermediary between a host device and the memory 205. For example, the controller 210, or various modules executed thereby, may receive write commands from a host device and determine how data associated with those write commands is managed with respect to the memory 205.

The interface 215 facilitates communicative coupling between the portable data storage device 200 and a host by allowing information to be transferred between the portable data storage device 200 and that host device. In exemplary embodiments, the interface 215 includes a USB plug that is insertable into a mating USB port of a host device. Alternatively, the interface 215 may include other standards for communicative coupling such as FireWire, Ethernet, Wireless USB, E-SATA, or Bluetooth. Furthermore, the interface 215 may comprise other interface technologies as they become available.

Figure 3:
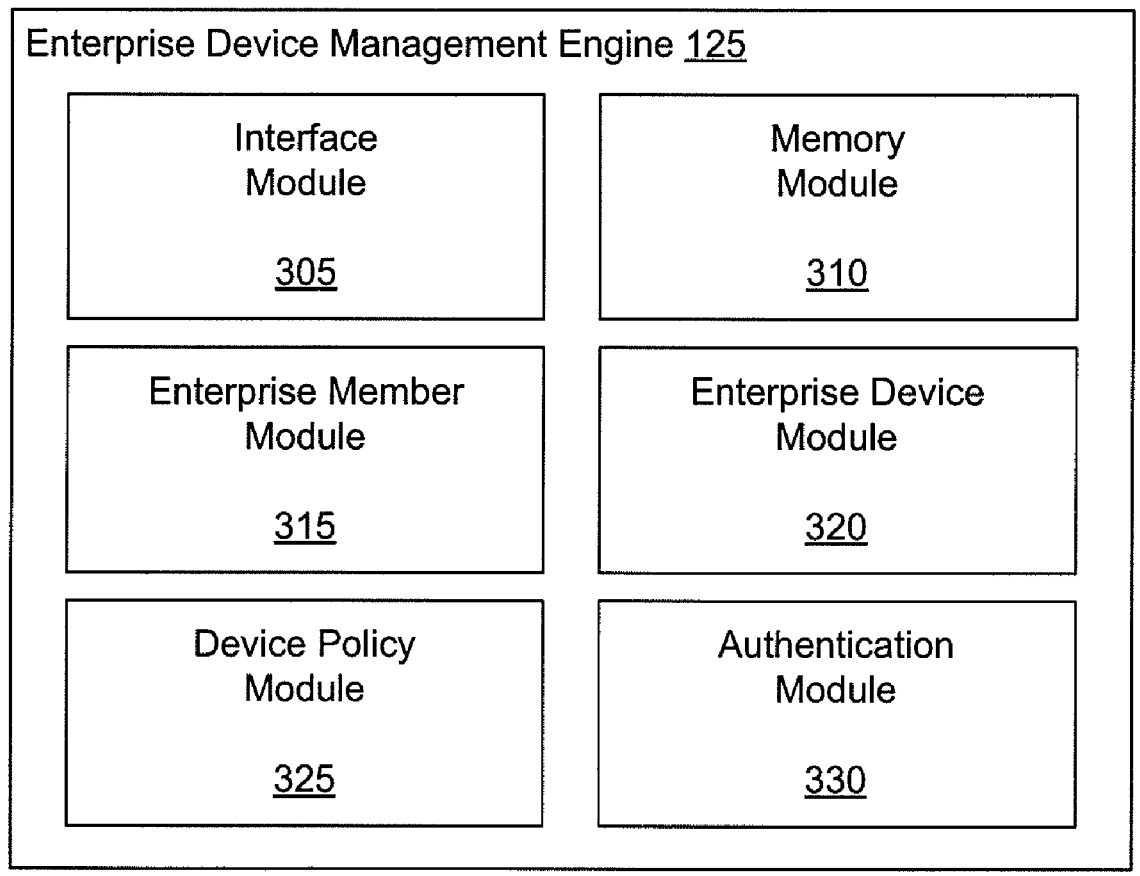
FIG. 3 is a block diagram of an exemplary enterprise device management engine.

FIG. 3 is a block diagram of an exemplary enterprise device management engine 125. In accordance with various embodiments, the enterprise device management engine 125, or certain modules thereof, may be stored in memory of a server operated by a third party. As depicted, the enterprise device management engine 125 includes an interface module 305, a memory module 310, an enterprise member module 315, an enterprise device module 320, a device policy module 325, and an authentication module 330. These modules may be executed by a processor to effectuate the functionality attributed thereto. The enterprise device management engine 125 may be composed of more or fewer modules (or combinations of the same) and still fall within the scope of the present technology. For example, the functionality of the enterprise member module 315 and the functionality of the enterprise device module 320 may be combined into a single module.

Execution of the interface module 305 allows administrators and members of an enterprise to access the third-party service 120. The third-party service 120 may be accessed through any of the computers 105A-105N via the network 130. In exemplary embodiments, the interface module 305 provides a centralized management console to enterprise administrators. Such a centralized management console may be a web-based interface such as a website. Alternatively, a centralized management console may comprise an application that is operated on one or more of the computers 105A-105N, and may communicate with the interface module 305 via the network 130. The interface module 305 may require a login name and password to be provided in order for the third-party service 120 to be accessed. In addition, the interface module 305 allows the third-party service 120 to communicate policy modifications to the enterprise administrator devices 110A-110N and the enterprise member devices 115A-115N. Exemplary policies are discussed in connection with the device policy module 325.

The memory module 310 allows the third-party service 120 to store information associated with other constituent modules of the enterprise device management engine 125. This information is encrypted in exemplary embodiments. Additionally, information stored by the memory module 310 may be stored in memory of one or more servers operated by the third party. Alternatively, the memory module 310 may store information remotely via the network 130, such as in memory located at an enterprise site, and subsequently retrieve that information when necessary.

The enterprise member module 315 can be executed to track administrators and members that belong to an enterprise. Furthermore, the enterprise member module 315 can track an administrator level attributed to each enterprise administrator. The administrator level may affect policies applied to the enterprise administrator device 110 associated with a given administrator. For example, a policy attributed to an enterprise administrator device 110 may determine whether the administrator associated with that enterprise administrator device 110 has privileges to authorize certain functions of other enterprise administrator devices 110, or whether that administrator can create a policy. In addition, the enterprise member module 315 can be executed to track changes in status of a member becoming an administrator, or an administrator becoming a member. Changes in status may also affect policies applied to the enterprise administrator device 110 associated with a given administrator, or policies applied to the enterprise member device 115 associated with a given member. Changes in status and administrator level may be made by an administrator having an appropriate authority through execution of the enterprise member module 315 in conjunction with the interface device 310.

Also in conjunction with the interface device 305, the enterprise member module 315 allows one or more administrators or members of an enterprise to be identified to have specific policies of their respective portable data storage device modified. These identified administrators or members may be referred to herein as candidates. As mentioned, each administrator is associated with one of the enterprise administrator devices 110A-110N, while each member is associated with one of the enterprise member devices 115A-115N. Also, a distinguishing factor between the administrator devices 110A-110N and the enterprise member devices 115A-115N is the respective policies attributed thereto.

Execution of the enterprise device module 320 tracks which portable data storage device (i.e., one of the enterprise administrator devices 110A-110N or one of the enterprise member devices 115A-115N) is associated with each of the enterprise administrators and the enterprise members. The enterprise device module 320, in conjunction with the interface device 305, allows an indication to be provided to an enterprise administrator of one or more candidate devices. The one or more candidate devices are each one of the portable data storage devices associated with a respective candidate identified through execution of the enterprise member module 315. The indication may further include authentication information associated with the candidate devices, as discussed in connection with the authentication module 330.

Execution of the device policy module 325 allows management of policies attributed the enterprise administrator devices 110A-110N and the enterprise member devices 115A-115N. The policies of any given candidate device can vary depending on the needs of a specific enterprise. These policies may be formulated by the third party or an enterprise. According to some embodiments, the policies determine whether the one or more candidate devices can be accessed. The policies may determine whether the one or more candidate devices must communicate with the third-party service prior to being accessed. Additionally, the policies may be related to one or more passwords associated with the one or more candidate devices. For example, the policy may dictate how many password retries are allowed when accessing a portable data storage device prior to absolute refusal of access, a strength of a password (e.g., length or complexity) needed for access to a portable data storage device, or whether a password for access to a portable data storage device is required to be backed up. In accordance with some embodiments, the policies determine an administrative level attributed to the one or more candidate devices. Furthermore, the policies may determine whether a candidate can control one or more features of a candidate device associated therewith. It is also noteworthy that the policies may be different for two or more candidate devices.

Also in exemplary embodiments, the policies may determine operability of software applications associated with the one or more candidate devices. For example, a policy may be established indicating that Mozilla Firefox web browser is allowed to be stored on a given portable data storage device. In some embodiments, an application may be compressed and/or encrypted within the memory 205, and subsequently be expanded so as to be operable, provided that an appropriate policy is applied. In some embodiments, an application may be downloaded from the third-party service 120 or a local server on an enterprise network. Administrators of a given enterprise may also set certain applications to be accessible to a select group of enterprise administrators and/or enterprise members based on a policy. Such certain applications can be provided by an enterprise or the third party, in accordance with various embodiments.

Execution of the authentication module 330 allows to third-party service 120 to authenticate portable data storage devices prior to policies attributed thereto being modified. In exemplary embodiments, the indication provided through execution of the enterprise device module 320 includes a different administrator-device public key associated with each of the one or more candidate devices and a shared administrator keypair. Those skilled in the art will appreciate the general concepts of public keys and keypairs. The authentication module 330, in conjunction with the interface module 305, may import each administrator-device public key into the one or more candidate devices associated therewith, and import the shared administrator keypair into each of the one or more candidate devices. The imported shared administrator keypair may be encrypted in each candidate device with the imported administrator-device public key associated with that candidate device.

Furthermore, each encrypted shared administrator keypair may be sent to the third-party service 120. Additionally, an administrator-device public key may be encrypted and signed by a public key of the third-party service 120. According to some embodiments, the indication provided by the third-party service 120 further includes a shared administrator public key. In addition, the shared administrator keypair may be encrypted and signed by a public key of the third-party service 120. Also in accordance with some embodiments, one or more of the shared administrator keypair associated with each candidate device or the administrator-device public key may be zeroized.

Figure 4:
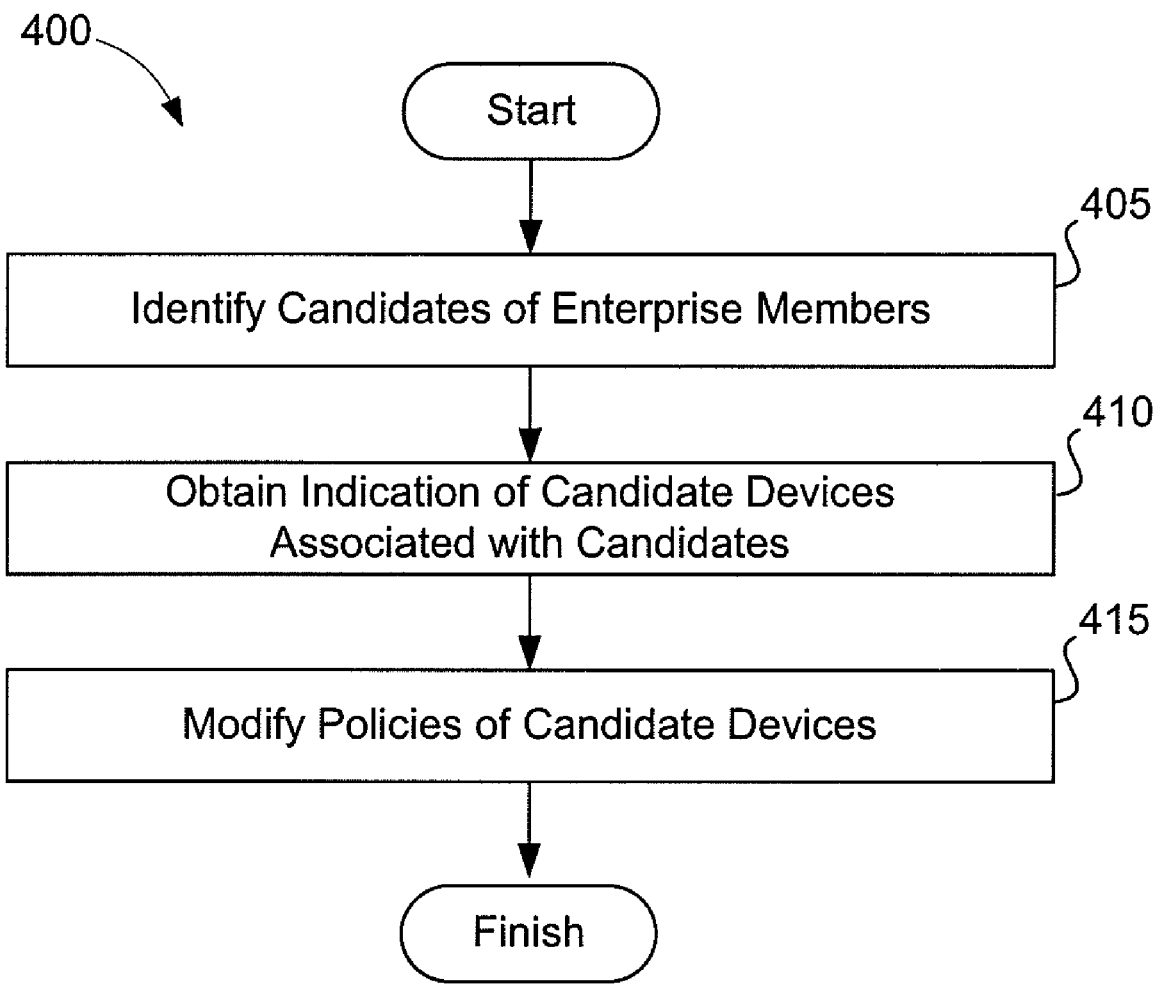
FIG. 4 is a flowchart of an exemplary method for managing policies of portable data storage devices in conjunction with a third-party service.

FIG. 4 is a flowchart of an exemplary method 400 for managing policies of portable data storage devices in conjunction with the third-party service 120. The steps of the method 400 may be performed in varying orders. Steps may be added or subtracted from the method 400 and still fall within the scope of the present technology.

In step 405, one or more candidates of a plurality of members in an enterprise may be identified via the third-party service 120. Each of the plurality of members may be associated with a respective portable data storage device. In exemplary embodiments, step 405 may be performed through execution of the enterprise member module 315.

In step 410, an indication of one or more candidate devices may be obtained that is provided by the third-party service 120. The one or more candidate devices each may be a portable data storage device associated with a respective candidate. Step 410 may be performed through execution of the enterprise device module 320, in accordance with various embodiments.

In step 415, policies of the one or more candidate devices may be modified. The interface module 305 may be executed to perform step 415 in exemplary embodiments.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A computer-implemented method for managing policies of portable data storage devices in conjunction with a third-party service, the method comprising:
   identifying one or more candidates of a plurality of members in an enterprise via the third-party service, each of the plurality of members being associated with a respective portable data storage device;
   obtaining an indication provided by the third-party service of one or more candidate devices, the one or more candidate devices each being a portable data storage device associated with a respective candidate;
   modifying policies of the one or more candidate devices;
   wherein the indication includes a different administrator-device public key associated with each of the one or more candidate devices and a shared administrator keypair; and
   importing each administrator-device public key into the one or more candidate devices associated therewith, and importing the shared administrator keypair into each of the one or more candidate devices.

2. The computer-implemented method of claim 1, wherein the policies determine whether the one or more candidate devices can be accessed.

3. The computer-implemented method of claim 1, wherein the policies determine operability of software applications associated with the one or more candidate devices.

4. The computer-implemented method of claim 1, wherein the policies determine whether the one or more candidate devices must communicate with the third-party service prior to being accessed.

5. The computer-implemented method of claim 1, wherein the policies are related to one or more passwords associated with the one or more candidate devices.

6. The computer-implemented method of claim 1, wherein the policies determine an administrative level attributed to the one or more candidate devices.

7. The computer-implemented method of claim 1, wherein the policies determine whether a candidate can control one or more features of a candidate device associated therewith.

8. The computer-implemented method of claim 1, wherein the policies are different for two or more candidate devices.

9. The computer-implemented method of claim 1, further comprising encrypting the imported shared administrator keypair in each candidate device with the imported administrator-device public key associated with that candidate device.

10. The computer-implemented method of claim 9, further comprising sending each encrypted shared administrator keypair to the third-party service.

11. The computer-implemented method of claim 1, wherein an administrator-device public key is encrypted and signed by a third-party service public key.

12. The computer-implemented method of claim 1, wherein the indication provided by the third-party service further includes a shared administrator public key.

13. The computer-implemented method of claim 12, wherein the shared administrator keypair is encrypted and signed by a third-party service public key.

14. The computer-implemented method of claim 1, further comprising zeroizing or deleting one or more of the shared administrator keypair associated with each candidate device or the administrator-device public key.

15. A system for managing policies of portable data storage devices in conjunction with a third-party service, the system comprising:
   a processor coupled to memory;
   an enterprise member code stored in the memory and executable by the processor to identify one or more candidates of a plurality of members in an enterprise via the third-party service, each of the plurality of members being associated with a respective portable data storage device;
   an enterprise device code stored in memory and executable by a processor to obtain an indication provided by the third-party service of one or more candidate devices, the one or more candidate devices each being a portable data storage device associated with a respective candidate;
   an interface code stored in memory and executable by a processor to modify policies of the one or more candidate devices;
   wherein the indication includes a different administrator-device public key associated with each of the one or more candidate devices and a shared administrator keypair; and
   importing each administrator-device public key into the one or more candidate devices associated therewith, and importing the shared administrator keypair into each of the one or more candidate devices.

16. A non-transitory computer readable storage medium having a program embodied thereon, the program executable by a processor to perform a method for managing policies of portable data storage devices in conjunction with a third-party service, the method comprising:
   identifying one or more candidates of a plurality of members in an enterprise via the third-party service, each of the plurality of members being associated with a respective portable data storage device;
   obtaining an indication provided by the third-party service of one or more candidate devices, the one or more candidate devices each being a portable data storage device associated with a respective candidate;
   modifying policies of the one or more candidate devices;
   wherein the indication includes a different administrator-device public key associated with each of the one or more candidate devices and a shared administrator keypair; and
   importing each administrator-device public key into the one or more candidate devices associated therewith, and importing the shared administrator keypair into each of the one or more candidate devices.

17. The non-transitory computer readable storage medium of claim 16, the method further comprising encrypting the imported shared administrator keypair in each candidate device with the imported administrator-device public key associated with that candidate device.

18. The non-transitory computer readable storage medium of claim 17, the method further comprising sending each encrypted shared administrator keypair to the third-party service.

19. The non-transitory computer readable storage medium of claim 16, wherein an administrator-device public key is encrypted and signed by a third-party service public key.

20. The non-transitory computer readable storage medium of claim 16, wherein the indication provided by the third-party service further includes a shared administrator public key.

* * * * *